United States Patent [19]

Shedd

[11] Patent Number: 4,742,518
[45] Date of Patent: May 3, 1988

[54] FAULT LOCATION SYSTEM FOR A DIGITAL TRANSMISSION LINE

[75] Inventor: Dennis A. Shedd, Lexington, Mass.

[73] Assignee: American Telephone and Telegraph Company, AT&T Bell Laboratories, Murray Hill, N.J.

[21] Appl. No.: 867,212

[22] Filed: May 27, 1986

[51] Int. Cl.[4] .............................................. H04B 3/46
[52] U.S. Cl. ..................... 371/22; 370/13.1; 371/5; 379/4
[58] Field of Search ..................... 371/5, 22; 370/13.1, 370/14; 379/4, 26; 375/10

[56] References Cited

U.S. PATENT DOCUMENTS

| | | | |
|---|---|---|---|
| 3,562,710 | 2/1971 | Halleck | 371/5 X |
| 3,692,964 | 9/1972 | Camiciottoli et al. | 335/3 |
| 3,760,127 | 9/1973 | Camiciottoli et al. | 340/825.07 |
| 3,895,352 | 7/1975 | Chisholm et al. | 371/22 |
| 3,976,835 | 8/1976 | Larner et al. | 370/13.1 X |
| 4,022,988 | 5/1977 | Lentz et al. | 371/5 X |
| 4,077,004 | 2/1978 | Higo | 375/4 |
| 4,122,358 | 10/1978 | Altmann | 371/5 |
| 4,211,920 | 7/1980 | Wakabayashi | 455/601 |
| 4,241,445 | 12/1980 | Payen | 371/5 |
| 4,309,771 | 1/1982 | Wilkens | 371/5 X |

OTHER PUBLICATIONS

"A New Approach to Fault Locating T1 Repeated Lines", *Telecommunications*, S. Ghosh, Nov. 1974, pp. 39-41.

"A 1 Gbit/s Westcott Data Test Set:", *ESSCIRC*, C. T. Mallett et al., Sep. 1979, pp. 14-16.

"GaAs Integrated Circuits for Error-Rate Measurement in High-Speed Digital Transmission Systems", *IEEE Jrnl. Solid-State Circuits*, C. A. Liechti, et al., pp. 402-408, Aug. 1983.

*Primary Examiner*—Charles E. Atkinson
*Attorney, Agent, or Firm*—Richard B. Havill

[57] ABSTRACT

A fault location system includes a test code generator located at an end terminal for transmitting a test code sequence of signals onto a digital transmission line. A line regenerator located along the transmission line detects the test code sequence of signals. Other circuitry interconnected with the line regenerator determines and stores a number count indicating how many errors are detected in the test code sequence. In response to a polling request from a fault location circuit in the end terminal, the other circuitry storing the count indicating errors transmits that count to a fault location circuit which calculates an error rate therefrom.

6 Claims, 3 Drawing Sheets

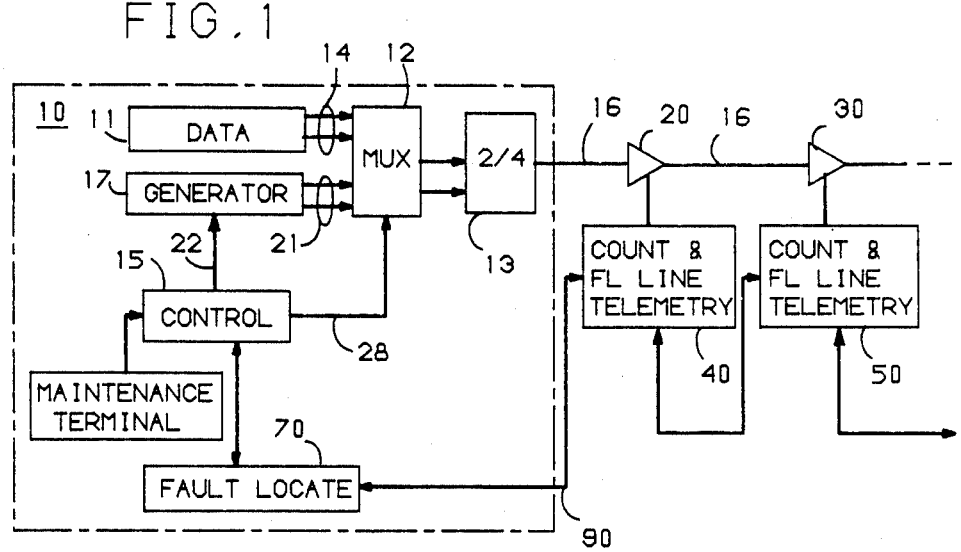
FIG.1
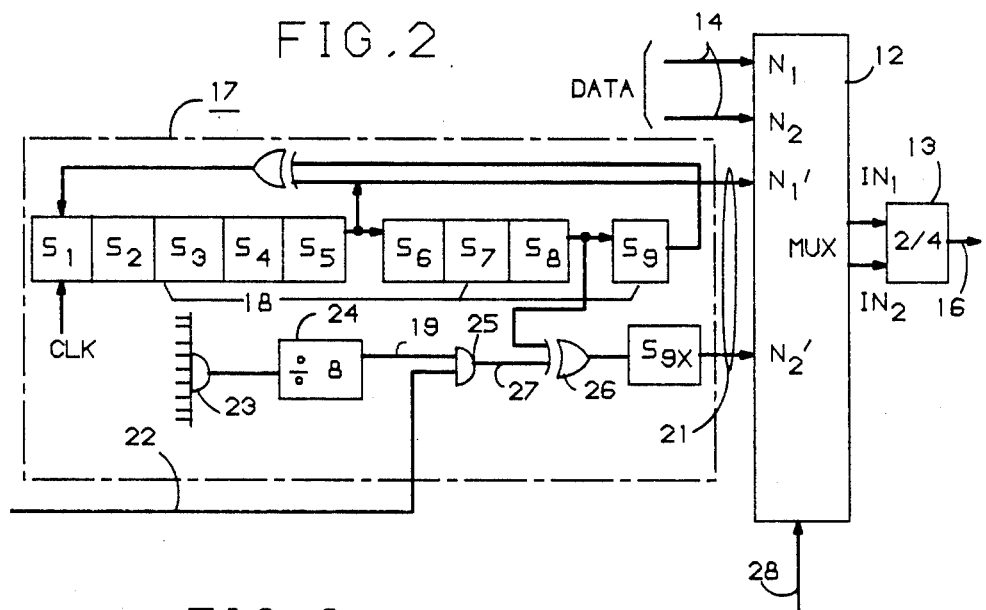
FIG.2
FIG.3
TABLE A
| IN$_1$ | IN$_2$ | OUTPUT LEVEL |
|---|---|---|
| 0 | 0 | +3 |
| 0 | 1 | +1 |
| 1 | 1 | −1 |
| 1 | 0 | −3 |

FAULT LOCATION SYSTEM FOR A DIGITAL TRANSMISSION LINE

BACKGROUND OF THE INVENTION

This invention relates to a digital transmission line fault location system which is more particularly described as a fault location system using error rates for determining the location of a fault.

Error rate measurements are made on transmission line to provide information indicating the quality of transmission such as excellent, good, fair, poor and failed. Error rate can be determined by checking parity on an in-service basis or by an out-of-service test using a pseudo-random code sequence. The in-service test requires recovery of framing at the location where the measurement is being made. This is prohibitively expensive when it is needed at each regenerator along the transmission line. The out-of-service test requires external test sets which are impractical for use at outside locations. Thus, error rate measurements are typically made on an end-to-end basis.

In many systems separate fault location circuits and equipment are being provided for locating suspected or known faults. Typically an individually assigned supervisory frequency is uniquely associated with each repeater location for purposes of polling the repeaters for fault location testing. By polling the repeaters with the uniquely assigned frequencies, it is possible to determine where a failure is located.

There are problems resulting from these testing arrangements. When the repeaters are polled with the separate circuits, it is possible to locate a complete failure in the system, but the location of a soft failure producing degraded operation is very difficult to determine. On the other hand, the known error rate monitoring arrangements, which test from end-to-end, can readily determine that a soft failure is affecting system operation but cannot readily determine where the soft failure is located.

It is desirable to develop an error rate measurement system which operates on a section-by-section basis for determining the location of any failure. Error rate measurements must be recovered from remote regenerator locations and transmitted to one of the terminals to be useful. In the prior art, facilities for these kinds of operations are not available.

SUMMARY OF THE INVENTION

This problem is overcome by a fault location system that includes a code generator in an end terminal for transmitting a coded digital sequence of signals onto a digital transmission line. A line regenerator located along the transmission line detects the test code sequence of signals. Other circuitry interconnected with the line regenerator determines an indication of a number of errors in the detected test code sequence. In response to a polling request from the end terminal, the other circuitry transmits the indication of the number of detected errors to the end terminal for calculating an error rate.

BRIEF DESCRIPTION OF THE DRAWINGS

This invention may be better understood by reading the following detailed description when that description is read with reference to the attached drawings wherein FIG. 1 is a block diagram of part of a digital transmission system;

FIG. 2 is a block diagram of terminal circuitry used for generating and transmitting a four-level quasi-random test code sequence;

FIG. 3 is a logic table for producing a four-level, or quaternary, signal from a pair of binary signals;

DETAILED DESCRIPTION

Figure 4:
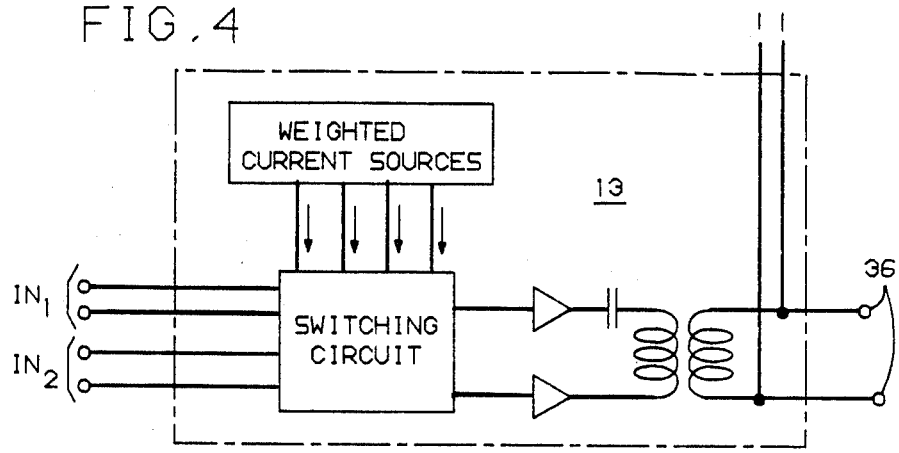
FIG. 4 is a block diagram of an arrangement for converting from a pair of binary signals to a four-level signal.

Referring now to FIG. 1, there is shown a part of a digital transmission system. The part shown includes the data transmitting and fault locating equipment 10 of the vest terminal together with a transmission line 16 including two eastbound regenerators 20 and 30 and their associated counting and fault line telemetry circuits 40 and 50.

In the data transmitting and fault locating equipment 10, there is a source of data 11 which includes a pair of digital transmission leads 14 that operate concurrently at a common hit rate, such as the D31 rate. During regular operation, the sequences of binary signals from the two digital transmission leads 14 are applied to and are forwarded through a multiplexer 12 to a converter 13. These two sequences of binary signals from the pair of digital transmission leads 14 are merged together by the code converter 13. When merged by the code converter 13, the resulting single sequence of data is a four-level, or quaternary, signal which is transmitted along the transmission line 16 to the first regenerator 20. After being detected and regenerated by the regenerator 20, the four-level signal is transmitted further along the transmission line 16 and through the regenerator 30 to additional regenerators and an east terminal, which are not shown. Only the west-to-east direction of transmission is shown, however, in a typical system there also is equipment for the east-to-west direction of transmission.

When a malfunction arises, fault locating circuitry is activated under control of a circuit 15. The fault locating circuitry includes a code sequence generator 17 that produces a pair of binary sequences, at the same bit rate as the sequences transmitted by the data source 11. Those sequences are applied over a pair of leads 21 to the multiplexer 12. Either a sequence with periodic pulse violations or a sequence without periodic pulse violations can be generated. In the fault locating mode, the control circuit 15 selects which of those sequences is generated and applies a control signal to the multiplexer 12 causing the multiplexer to disable transmission of the pair of sequences of binary signals from the digital transmission leads 14 and to enable transmission of the pair of selected sequences of binary signals from the code sequence generator 17 to the code converter 13.

The two-level to four-level converter 13 converts the two transmitted sequences of binary signals into a four-level, or quaternary, signal for transmission over the line 16 to and through the regenerators 20 and 30 to the east terminal.

The transmitted test code sequence is selected so that any regularly transmitted sequence of binary signals will not simulate the test code sequence. The test code sequence also is selected so that each of the repeater fault location circuits 40 and 50 can determine test code sequence violations that occur in the signal recovered by the associated regenerators 20 and 30. Any test code sequence violations are recorded as error information. Subsequently this recorded error information is transmitted to the west terminal by way of a fault location line 90 in response to polling requests. In the west terminal, the error information from one or more repeaters is received by a fault location circuit 70 which determines a test error rate for each repeater location. The test error rates can be used for determining which repeater section is failing. Advantageously the test error rate information can be interpreted at a time when the failure is a soft failure, i.e., when the error rate has risen somewhat but before the transmission line has failed completely. Under such circumstances repairs can be made conveniently before a total failure occurs.

Referring now to FIG. 2, the test code sequence generator 17 includes a pseudorandom binary sequence generator which produces a maximal length pseudorandom sequence, as described in "Understanding Pseudo-Random Circuits", *Radio Electronics*, April 1975, pp. 42–49. An illustrative serial shift register 18 includes 9-stages with feedback from both the fifth stage and the last stage for generating a pseudorandom test code sequence containing 511 bits. Interestingly there are two last stages $S_9$ and $S_{9X}$. Feedback is taken from the last stage $S_9$. A lead 19 provides periodic signals which complement pulses of the test code sequence and thereby cause pulse violations to be inserted selectively into the test code sequence at the input to stage $S_{9X}$. A signal on a control lead 22 determines whether or not the periodic pulse violations are inserted.

Outputs to be transmitted from the shift register 18 are taken from the fifth stage $S_5$ and from the extra last stage $S_{9X}$ to produce two test code sequences. The two test code sequences are identical with each other except that the test code sequence taken from the stage $S_{9X}$ is delayed behind the other test code sequence by four clock cycles. Another exception is that the delayed test code sequence may have periodic pulse violations inserted.

The periodic pulse violations are generated as follows. Inputs to a gate 23 respond to a specifically selected state of the shift register 18. Every time the shift register 18 reaches the selected state, a high level pulse is produced by the gate 23 for one clock cycle. A divider circuit 24 divides the pulse repetition rate of the high level pulses by eight and applies resulting high level pulses to an AND gate 25. When the signal on the control lead 22 is high, the high level pulses from the divider circuit 24 are applied by the AND gate 25 through a lead 27 to an EXCL OR gate 26. The other input of the EXCL OR gate 26 is the test code sequence tapped from the stage $S_8$ of the shift register 18. The high level pulse on the lead 27 causes a data stream pulse from the shift register stage $S_8$ to be complemented thereby producing a pulse violation in the test code sequence. As a result, pulse violations are inserted periodically into the test code sequence being applied to the register stage $S_{9X}$.

The two output test code sequences are transmitted to the multiplexer 12. The first output test code sequence from the fifth stage $S_5$ is applied to the multiplexer 12 at an input $N_1'$. The delayed output test code sequence from the extra last stage $S_{9X}$ is applied to an input $N_2'$ of the multiplexer 12. A control signal on a lead 28 causes the multiplexer 12 to transfer the undelayed and the delayed test code sequences from the inputs $N_1'$ and $N_2'$ to inputs $IN_1$ and $IN_2$ of the two-level to four-level converter 13.

When the error testing arrangement is not being used and the regular digital transmission system is in service, the signal on the lead 28 changes the selection of inputs made by the multiplexer 12. At such times the undelayed and delayed test code sequences on the leads $N_1'$ and $N_2'$ are disabled from being transferred to the code converter 13. Instead the regular data sequences on the leads $N_1$ and $N_2$ are transferred by the multiplexer 12 to the inputs $IN_1$ and $IN_2$ of the code converter 13.

Whether the regular data sequences or the pseudo-random test code sequences are applied to the code converter 13, it converts the two binary sequences applied to its inputs into a single four-level signal on the transmission line 16.

Referring now to FIG. 3, there is shown a TABLE A which is a truth table for converting from two binary sequences to a single four-level signal. The four levels are selected to be $+3$, $+1$, $-1$, and $-3$. These four levels provide equal separation between adjacent levels for facilitating detection of the various levels. Each row in TABLE A represents the conversion of one possible pair of input bits into a corresponding output level. For instance the top row shows that an input pair of binary zeros is converted to the output level $+3$.

Referring now to FIG. 4, there is a block diagram of the code converter 13 used in FIGS. 1 and 2 for converting a pair of binary sequences on inputs $IN_1$ and $IN_2$ into a four-level signal on output leads 36. The arrangement and operation of the circuit 13 is presented in greater detail in U.S. Pat. No. 4,606,046, issued in the name of J. J. Ludwick.

Figure 5:
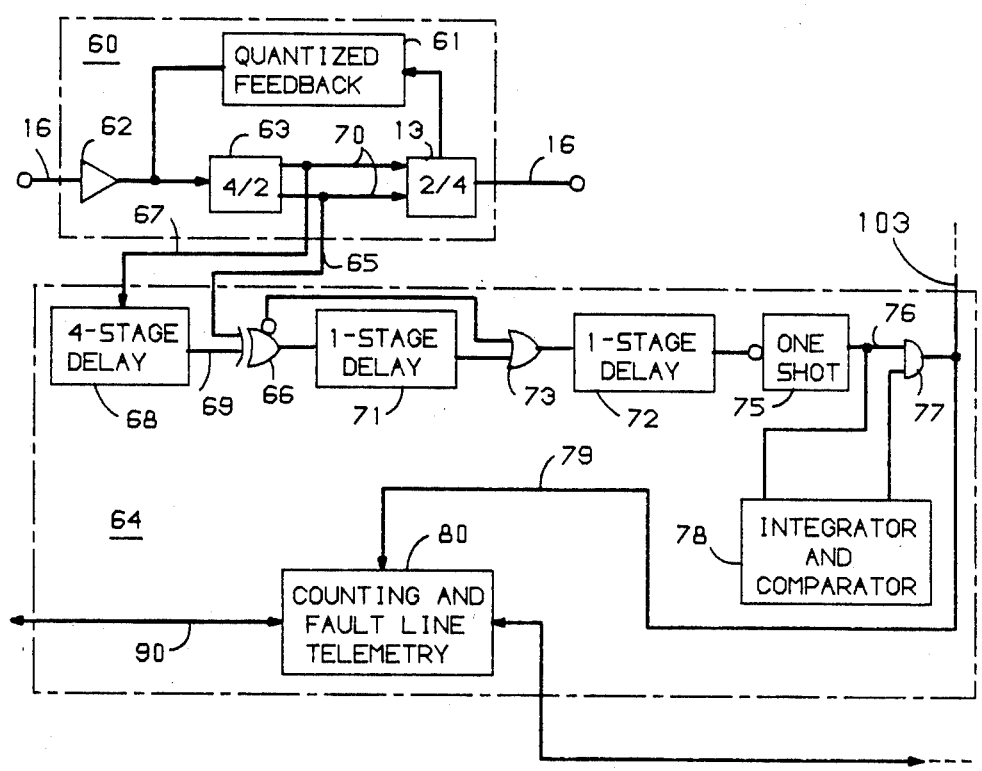
FIG. 5 is a block diagram of a repeater arrangement for detecting errors during a test using the test code sequence.

In FIG. 5, there is shown a four-level regenerator 60 arranged for fault location. The regenerator 60 may be used in the system of FIG. 1 for either regenerator 20 or 30. In the regenerator 60 of FIG. 5, an equalizer 62 receives the four-level signal from a section of transmission line 16. As previously mentioned, the received signal is equalized to produce a suitable four-level signal. After being equalized, the information in the received signal is detected and converted to two sequences of binary signals by a four-level to two-level converter 63. For optimum detection of the four different levels, the received signal is decoded with reference to zero, $+2$ and $-2$ volts.

The four-level to two-level converter 63 is described in greater detail in a copending patent application, filed concurrently herewith in the names of Graczyk, Ludwick and Farsons. This converter 63 is designed to convert from the four-level signal to a pair of two-level signals, to amplify the resulting pairs of two-level signals, and to retime them.

The output of the four-level to two-level converter 63 is two sequences of binary signals. Both of the sequences of binary signals are applied to the inputs of another two-level to four-level converter 13. This two-level to four-level converter 13 merges the two sequences of binary signals into a four-level signal. As previously mentioned, a more complete description of the two-level to four-level converter 13 is presented in U.S. Pat. No. 4,606,046 issued in the name of J. J. Ludwick. Coding of the signals is in accordance with the truth table shown in FIG. 3. A quantized feedback arrangement 61 applies the output of the two-level to four-level converter 13 back to the input of the four-level to two-level converter 63. Thus the regenerator receives and regenerates the received four-level signal by converting the received four-level signal down to two sequences of binary signals and subsequently converting the two sequences of binary signals back to a regenerated four-level signal.

It should be recalled that at all times the two tranmission leads 14 in FIG. 1 are applying two sequences of binary signals to the multiplexer 12. Simultaneously the test generator 17 also applies two sequences of binary signals over the leads 21 to the multiplexer 12. A control signal on the lead 28 from the control circuit 15 determines whether the two sequences of binary signals from the transmission leads 14 or the pair of binary test code sequences from the test generator 17 are applied to the input of the two-level to four-level converter 13.

Regardless of the input selected for the two-level to four-level converter 13 as FIG. 1 merges the two received sequences and produces a single four-level signal which is transmitted along the transmission line 16. Whichever pair of sequences of binary signals is represented by the four-level signal, that pair of sequences of binary signals is reproduced at the output of the four-level to two-level converter 63 in the regenerator 60 of FIG. 5. Thus when the four-level signal being transmitted on the line 16 represents the test generator signals, the pseudorandom sequence of binary signals and that same sequence delayed by n time slots are reproduced separately on leads 70 by the four-level to two-level converter 63.

Both of these sequences of binary signals are tapped off and are used in the fault location circuit 64, which may be used as either of the circuits 40 or 50 of FIG. 1. The seond, or delayed, pseudorandom sequence of binary signals is applied in the circuit 64 directly by way of a lead 65 to an input of a comparator 66, which is shown illustratively as an EXCL OR gate. The first, or undelayed, pseudorandom sequence of binary signals is applied in the circuit 64 by way of a lead 67 to a delay circuit 68 which delays the first sequence by n time slots. In FIG. 5 the delay is shown illustratively as n=4 time slots. The delayed first pseudorandom sequence of binary signals is applied by way of a lead 69 to another input of the comparator 66. Since the first and second pseudo-random sequences of binary signals are alike except for any periodic pulse violation that may have been inserted by the test generator 17 and since both sequences have been delayed by n time slots (one is delayed before transmission and one is delayed after conversion in the regenerator), concurrent pulses of the two sequences should be alike unless there is an error pulse or a periodic pulse violation in one of them. An error pulse of course is caused by a malfunction of some circuit or because of some trouble in the transmission line 16. A periodic pulse violation, however, is a pulse purposely changed in one sequence but not in the other sequence before transmission, as described previously. The comparator 66 produces a zero logic level output when the concurrent input pulses are alike, such as when there are no errors, and a one logic level output when concurrent input pulses are different from one another, such as when there is an error or a periodic pulse violation. During a fault locating procedure, a one logic level from the comparator 66 indicates that an error of a periodic pulse violation has occurred. Thus for the fault locating procedure, the comparator 66 produces an error indication only when an error or a periodic pulse violation occurs. Isolated errors cause a one logic level from the comparator 66. An error burst also will cause a one logic level from the comparator 66 but will not necessarily produce a separate pulse for each error pulse of the burst.

The repeater fault location circuit 64 provides memory functions and some logic circuitry for integrating error signals with one another and for screening out signals produced by the comparator 66 when regular data signals are being processed by the regenerator.

If the tip and ring leads are reversed along the transmission line 16 and before the regenerator 60 of FIG. 5, the signal on one of the leads 70 also will be inverted. This is a tip-ring reversal. As a result of such a signal inversion, the comparator 66 produces an inverted output signal. This means that during a fault location test procedure, error signals are a zero logic level rather than the one logic level, previously described.

To solve this tip-ring reversal problem, a pair of flip-flop circuits 71 and 72 and an OR gate 73 are inserted in the fault location circuit 64. As a result of the operation of the flip-flops 71 and 72 and OR gate 73 and regardless of whether or not there is a tip-ring reversal, the input to a one-shot circuit 75 normally is a low logic level during any fault location test procedure. The occurrence of any errors or periodic pulse violations causes the flip-flop 72 to produce a one logic level pulse for triggering the one-shot circuit 75. Duration of the one-shot circuit output pulse is sufficiently long that the error pulses or periodic pulse violations are stretched out and thereby reduce the frequency of error signals. This reduced frequency provides an indication of an errored period of operation and improves burst error immunity of the fault location system.

When the pseudorandom test sequences are not transmitted and regular data sequences are transmitted onto the transmission line 16, the two sequences of signals apply random inputs to the comparator 66. These signals, when processed by the comparator 66, the flip-flops 71 and 72, and the OR gate 73, produce a sequence of pulses in which half of the pulses are logic level one. In response thereto, the one-shot circuit 75 produces a sequence in which almost all pulses are logic level one. This clearly is a different output pulse pattern than the pattern produced during fault location testing.

These output pulse patterns from the one-shot circuit 75 are applied by way of a lead 76 directly to an input of an AND gate 77. The output pulse patterns also are processed through an integrator and comparator circuit 78, which produces a one logic level when its input has a low 1's density (from a fault location test sequence) and produces a zero logic level when its input has a high 1's density (from a regular data sequence). Thus the AND gate 77 is open for passing error indication signals during a fault location test and is closed preventing the passage of signals when the regular data sequences are being transmitted. Error indication signals which pass through the AND gate 77 travel along a fault location bus 79 to a counting and fault line telemetry circuit 80.

Previously with respect to FIG. 1, it was mentioned that the fault location circuit 70 sends commands out on the fault location line 90 for controlling fault location testing and response. For such a fault location test, the control circuit 15 in FIG. 1 produces on the lead 28 a signal which disables transmission of regular data sequences on the leads 14 and enables transmission of the test code sequence. Then the fault location circuit 70, using a multi-tone signaling scheme, sends on the fault location line 90 a pair of tones selected to represent a clear command. This clear command signal is received in the counting and fault line telemetry circuit 80 of FIG. 5.

Figure 6:
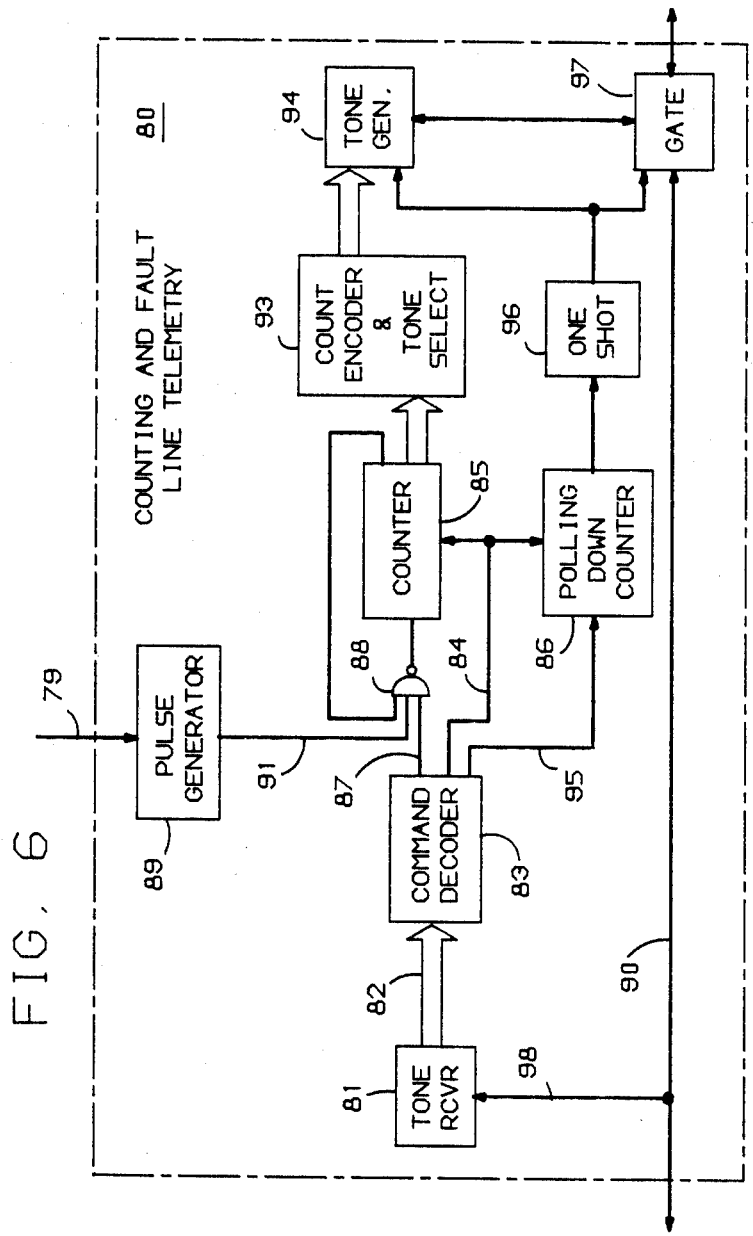
FIG. 6 is a block diagram of a circuit for counting errors detected during the test.

Referring now to FIG. 6, the clear command signal on the fault location line 90 is detected by a tone receiver 81 via the lead 98 which produces two 1-out-of-4 signals on leads 82 and applies them to a command decoder circuit 83. The decoded clear command produces a signal on lead 84 for clearing an error indication counter 85 and for presetting a polling down counter 86.

Subsequently start and stop commands are sent by the fault location circuit 70 of FIG. 1 by way of the fault location line 90 to the counting and fault line telemetry circuit 80. The elapsed time between the start and stop commands is a predetermined duration. When the start and stop commands are received and decoded by the tone receiver 81 and the command decoder 83 in FIG. 6, resulting signals on a lead 87 enable and thereafter disable a NAND gate 88 for applying error indication pulses to the error counter 85. During the predetermined period, the test code sequence is transmitted over the transmission line 16 and errors are determined. Error indication pulses on the fault location bus 79 are reshaped by a pulse generator 89 and are sent to the NAND gate 88. When the start pulse on the lead 87 enables the NAND gate 88, the error indication pulses on a lead 91 are counted by the error counter 85. The error indication counting continues through the predetermined period until the stop command or a full counter disables the NAND gate 88. Thus an indication of the errors is counted by the counter 85, which retains that count.

The resulting count is encoded into other multi-tone pairs of signals by a count encoder and tone selector 93 and a tone generator 94.

The polling process can now take place. Fault location circuit 70 of FIG. 1 sends out on the fault location line 90 the polling command which is another pair of multi-tone signals. Once received and decoded in the command decoder circuit 83 of FIG. 6, the polling command produces a decrement signal on a lead 95. The polling down counter 86, having been preset to a unique state by the clear command, now is decremented. If it decrements to the zero state, it signifies that the associated repeater location test result is being requested. An output pulse is produced by the polling down counter and is stretched by a one-shot circuit 96. The resulting output pulse from the one-shot circuit 96 enables the selected multi-tone signals, representing the stored error count indication, to be transmitted from the tone generator 94 through an enabled gate 97, and the fault location line 90 to the fault location circuit 70 of FIG. 1. Thus the fault line telemetry interconnected with a regenerator at one repeater location responds to the polling request and sends back to the west terminal an indication of the magnitude of the error count during the test period.

Other regenerators and their fault line circuits can be connected into the counting and fault line telemetry circuit 80 by leads 103 shown in FIG. 5.

The polling down counter of each repeater location is preset to a unique count state, i.e., a different count state than all of the other repeater locations. Starting with the west terminal, its polling down counter is preset to the count state 1. The polling down counter of the next repeater is preset to the count state 2 and so on.

In response to the first polling command, the polling down counter in the first repeater location is decremented and responds to the fault location circuit 70 in FIG. 1 by sending the repeater location stored error count indication. In the other repeater locations, the polling down counters are also decremented, but they do not respond by transmitting any information. The second polling command causes the polling down counter in the second repeater location to be decremented and initiate the sending of the stored error count indication while the polling down counters in the third and other repeaters are decremented again. This polling procedure is continued until all repeater locations have responded to the fault location circuit 70 of FIG. 1.

By performing the fault location test one time and subsequently polling all regenerators along its transmission line 16, the terminal 10 receives error indication readings for each of the regenerators 20 and 30 and others not shown. These error indication readings then are processed into error rates which will disclose which repeater section, if any, has failed or is operating marginally.

The error rate reading for each repeater location is determined at the west terminal 10 of FIG. 1. Each error count indication, which is received as a result of the polling procedure, is divided by the elapsed time of the test period, i.e., the predetermined time between the start and stop commands.

Several regenerators positioned at one repeater location can all use a single counting and fault line telemetry circuit 80 for the following reasons. Each of the regenerators has its own error detection circuit with an output which connects with the lead 79 of FIG. 5. Each one of those error detection circuits has an AND gate 77 which is closed preventing the transmission of signals to the fault location bus 79 when the regular data sequences are being transmitted through the respective regenerators. Normally all of the regenerators are transmitting regular data and none of them transmits to the bus 79.

At any time only one line of the regenerators is subject to fault location testing. As a result only one regenerator at each repeater location undergoes fault location testing. The output of its error detection circuit is enabled to pass through its AND gate 77 to the fault location bus 79 for responding to the end terminal. Information thereby provided is identified directly with a specific regenerator at a specific repeater location.

The foregoing discloses an illustrative embodiment of the invention. This embodiment together with others, which are made obvious in view thereof, are considered to be within the scope of the appended claims.

What is claimed is:

1. A digital transmission line fault location system including line termination means arranged for transmitting a test code sequence of signals onto the digital transmission line, and line regenerator means located along the digital transmission line for detecting the test code sequence of signals, the fault location system being characterized by
   a fault location line.
   means interconnected with the line regenerator means for determining and storing a count indicating errors detected in the test code sequence of signals during a predetermined period,
   a fault location circuit in the line termination means being arranged for requesting over the fault location line a return transmission of the count indicating detected errors from the determining and storing means, and the determining and storing means being responsive to the request from the fault location circuit for transmitting to the fault location circuit the count indicating detected errors during the predetermined period.

2. A digital transmission system in accordance with claim 1 wherein the fault location circuit applies a test initiation signal to the line termination means for enabling transmission of the test code sequence on the transmission line and of commands to the determining and storing means for resetting the determining and storing means and for commencing the determination of the count indicating errors in the detected test code sequence for a predetermined period.

3. A digital transmission system in accordance with claim 2 wherein the fault location circuit applies a polling command over the fault location line to the determining and storing means for requesting a return transmission over the fault location line of the count indicating errors in the detected test code sequence, and means, included in the fault location circuit, for detecting and storing the count received by way of return transmission.

4. A digital transmission line in accordance with claim 1 wherein the fault location circuit processes the count received by way of the return transmission together with the duration of the test period for determining a test error rate for determining whether or not the associated repeater span is functioning properly.

5. A digital transmission line fault location system comprising means located at a line terminal for transmitting selectively over a digital transmission line either a regular data sequence or a test code sequence;

means located along the digital transmission line and responsive to the transmitted sequence for regenerating the transmitted sequence;

means connected with the sequence regenerating means for determining whether the sequence received thereby is the regular data sequence or the test code sequence;

means connected with the determining means for detecting and indicating errors at the regenerator location when the test code sequence is received; and means connected with the detecting and indicating means for counting error indications.

6. A digital transmission line fault location system in accordance with claim 5 further comprising means interconnected with the regenerator for receiving commands transmitted from the line terminal; and means interconnected with the command receiving means and the error detecting and indicating means for transmitting to the line terminal an error magnitude indication.

* * * * *

UNITED STATES PATENT AND TRADEMARK OFFICE
CERTIFICATE OF CORRECTION

PATENT NO. : 4,742,518

DATED : May 3, 1988

INVENTOR(S) : Dennis A. Shedd

It is certified that error appears in the above-identified patent and that said Letters Patent is hereby corrected as shown below:

```
In the Specification
      col. 1, line 12, "line" should read --lines--.
      col. 2, line 21, "vest" should read --west--,
              line 28, "hit" should read --bit-- and
              line 28, "D31" should read --DS1--.
      col. 4, line 53, "Farsons" should read --Parsons--.
      col. 5, line 19, should read --four-level converter 13
              of FIG. 1, it merges the two received--,
              line 29, "n" should read --n--,
              line 35, "seond" should read --second--,
              line 41, "n" should read --n-- and
              line 49, "n" should read --n--.
      col. 8, line 61, "." should read --,--.
```

Signed and Sealed this

Seventeenth Day of January, 1989

Attest:

DONALD J. QUIGG

Attesting Officer

Commissioner of Patents and Trademarks